Feb. 3, 1942.  A. MAURER  2,271,598

MACHINE TOOL

Filed March 22, 1940  7 Sheets-Sheet 1

Inventor,
Albrecht Maurer,
Frank L. Appleman,
Attorney.

Feb. 3, 1942.   A. MAURER   2,271,598
MACHINE TOOL
Filed March 22, 1940   7 Sheets-Sheet 2
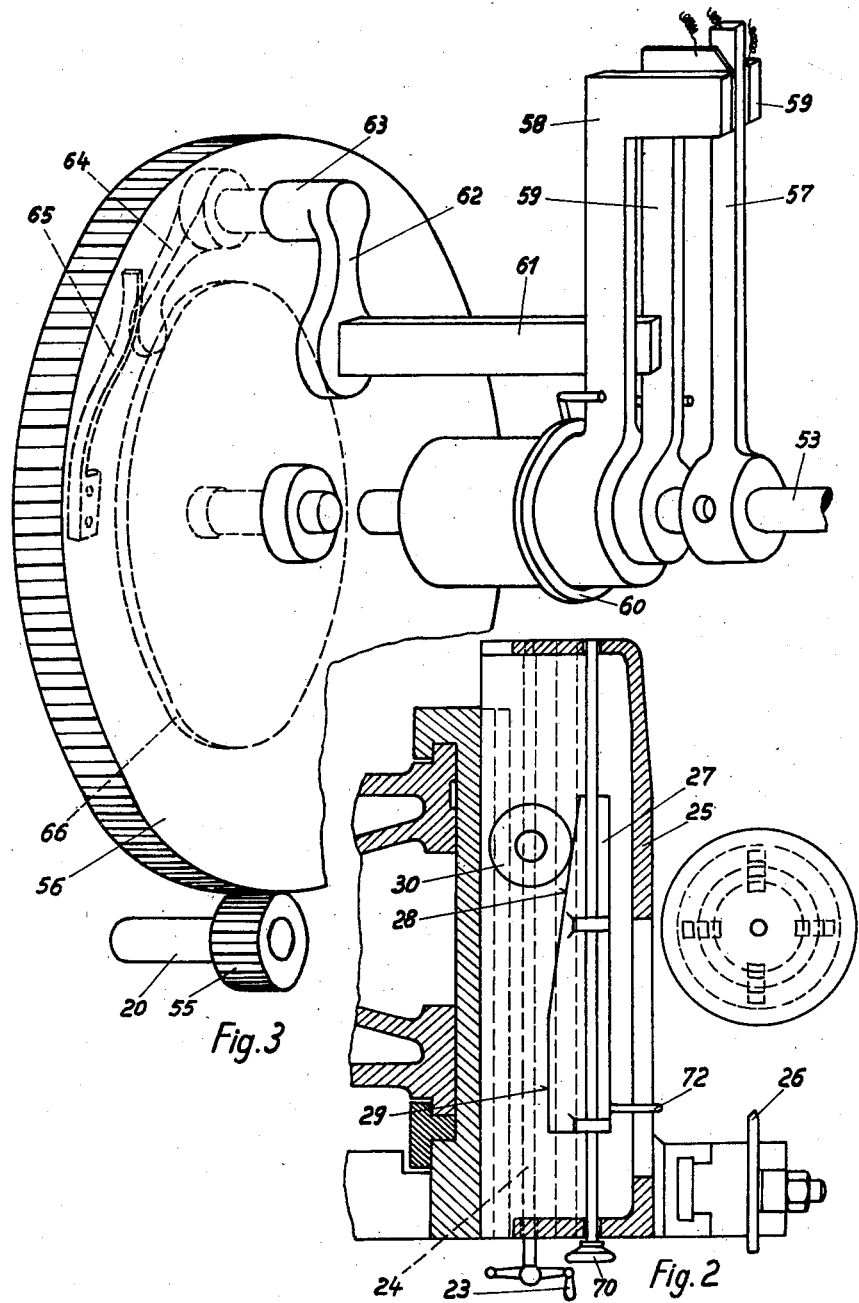

Feb. 3, 1942.  A. MAURER  2,271,598
MACHINE TOOL
Filed March 22, 1940  7 Sheets-Sheet 3
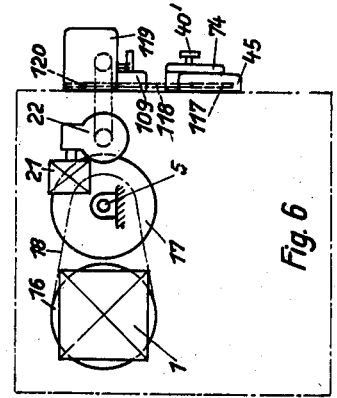
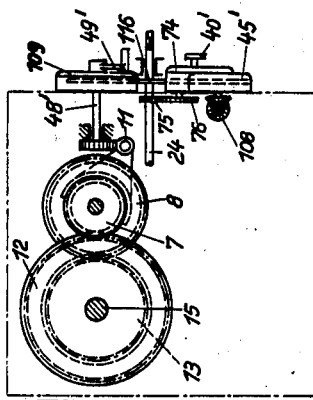
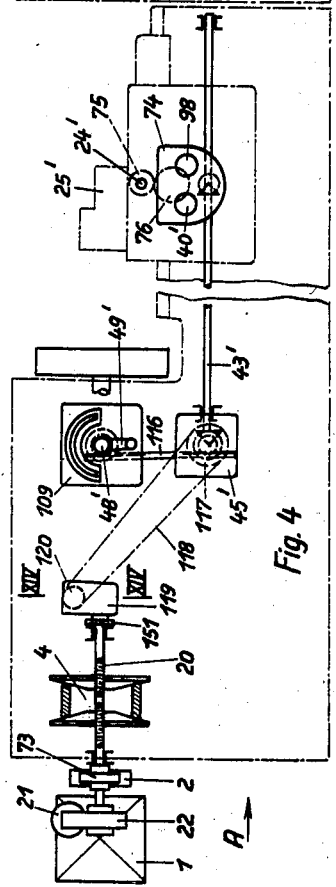
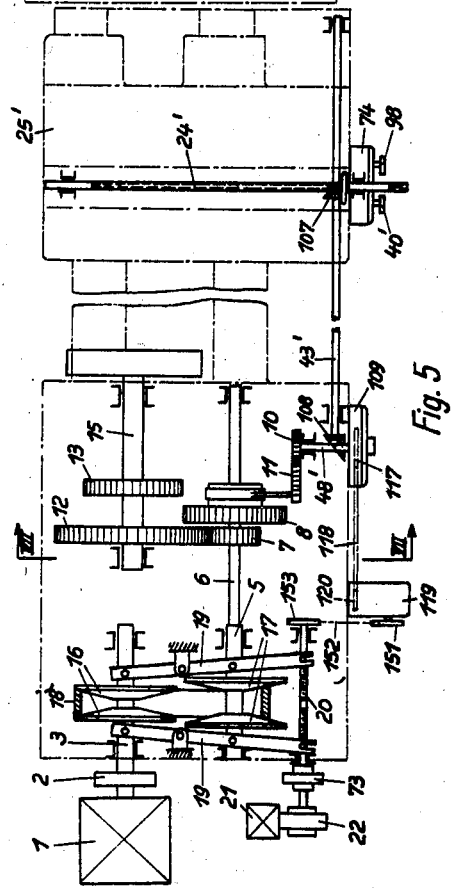

Feb. 3, 1942.                A. MAURER                 2,271,598
                            MACHINE TOOL
                     Filed March 22, 1940          7 Sheets-Sheet 4
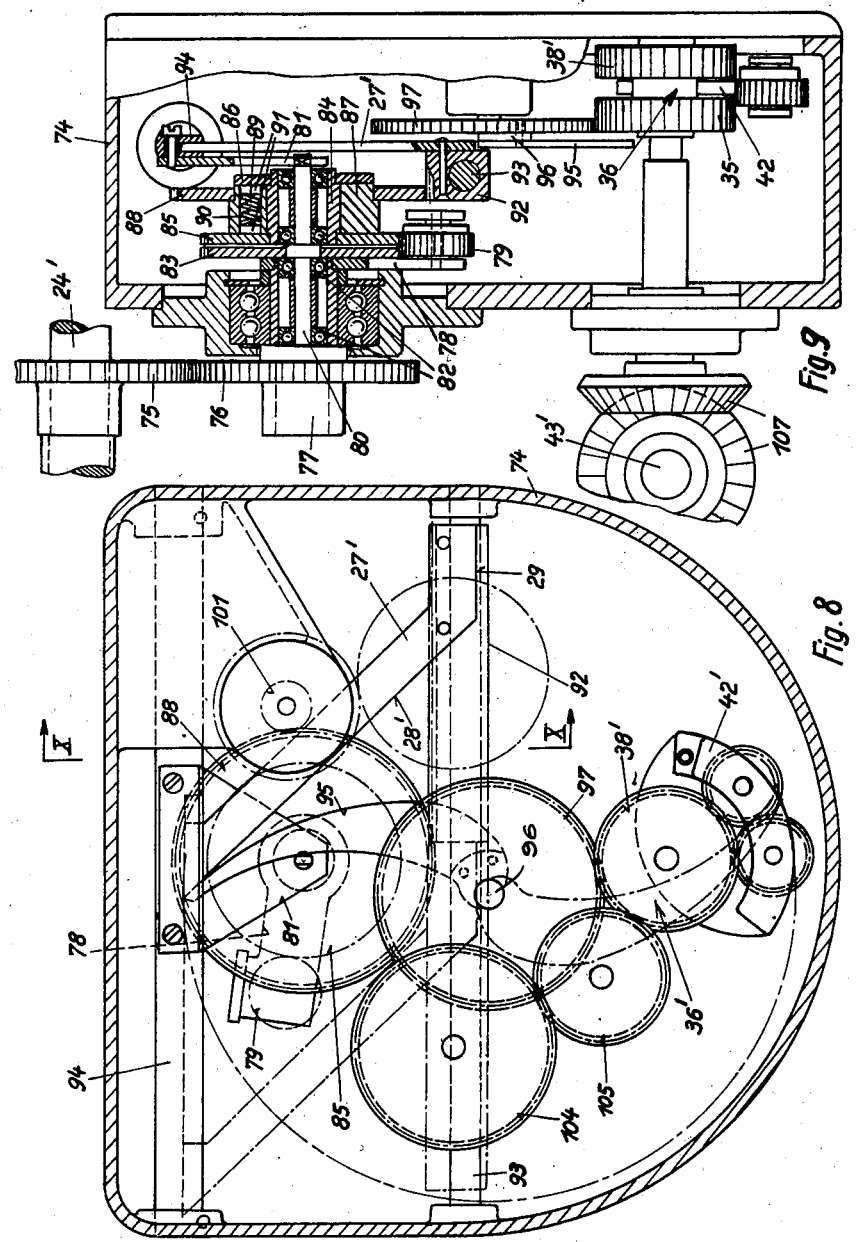

Feb. 3, 1942.    A. MAURER    2,271,598
MACHINE TOOL
Filed March 22, 1940    7 Sheets-Sheet 5
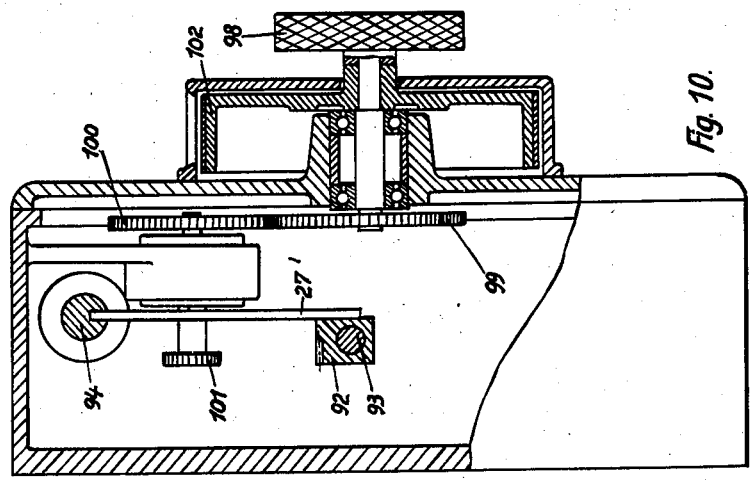
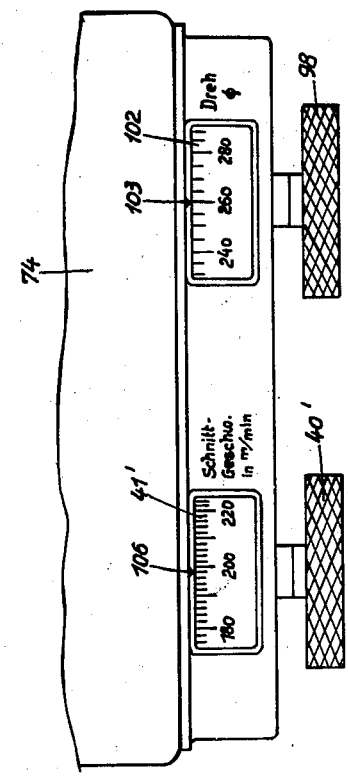
Inventor,
Albrecht Maurer,
G Frank S. Appleman
Attorney.

Feb. 3, 1942.  A. MAURER  2,271,598
MACHINE TOOL
Filed March 22, 1940  7 Sheets-Sheet 6

Inventor,
Albrecht Maurer,
Frank S. Appleman,
Attorney.

Feb. 3, 1942.  A. MAURER  2,271,598
MACHINE TOOL
Filed March 22, 1940  7 Sheets-Sheet 7
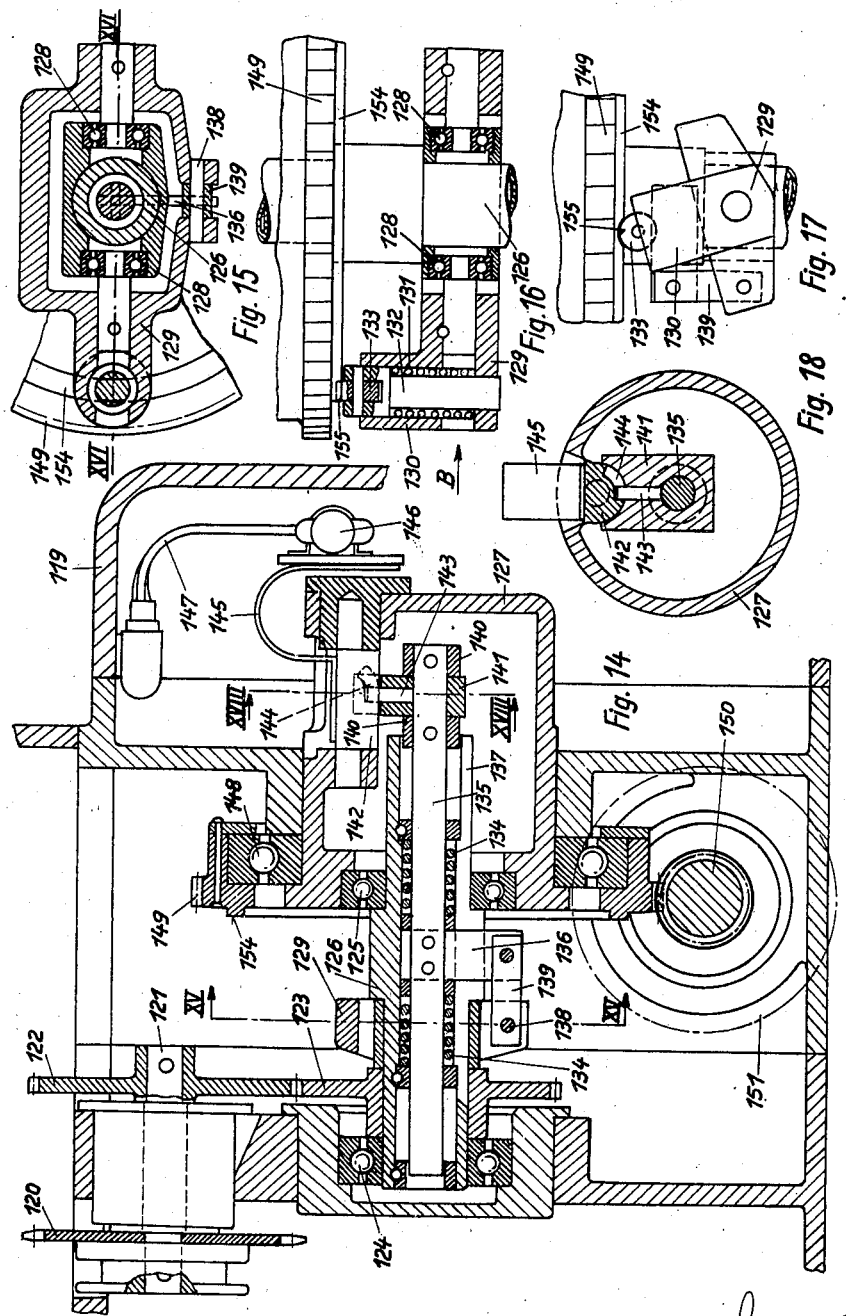
Inventor,
Albrecht Maurer,
by Frank S. Appleman,
attorney.

Patented Feb. 3, 1942

2,271,598

UNITED STATES PATENT OFFICE 2,271,598

MACHINE TOOL

Albrecht Maurer, Bad Homburg v. d. Hohe, Germany, assignor to P. I. Antrieb Werner Reimers K.-G., Bad Homburg v. d. Hohe, Germany, a Corporation of Germany Application March 22, 1940, Serial No. 325,425
In Germany March 22, 1939

15 Claims. (Cl. 82—29)

This invention relates to machine tools and has special reference to a lathe or the like.

One important object of the invention is to provide a novel construction of machine tool having means to insure constant cutting speed.

A second important object of the invention is to provide a novel construction of machine tool provided with a speed regulator and having an adjusting device controlling the action of the speed regulator.

With the above and other objects in view, the invention consists in general of certain novel details of construction and combinations of parts hereinafter fully described, illustrated in the accompanying drawings and particularly claimed.

Figure 1:
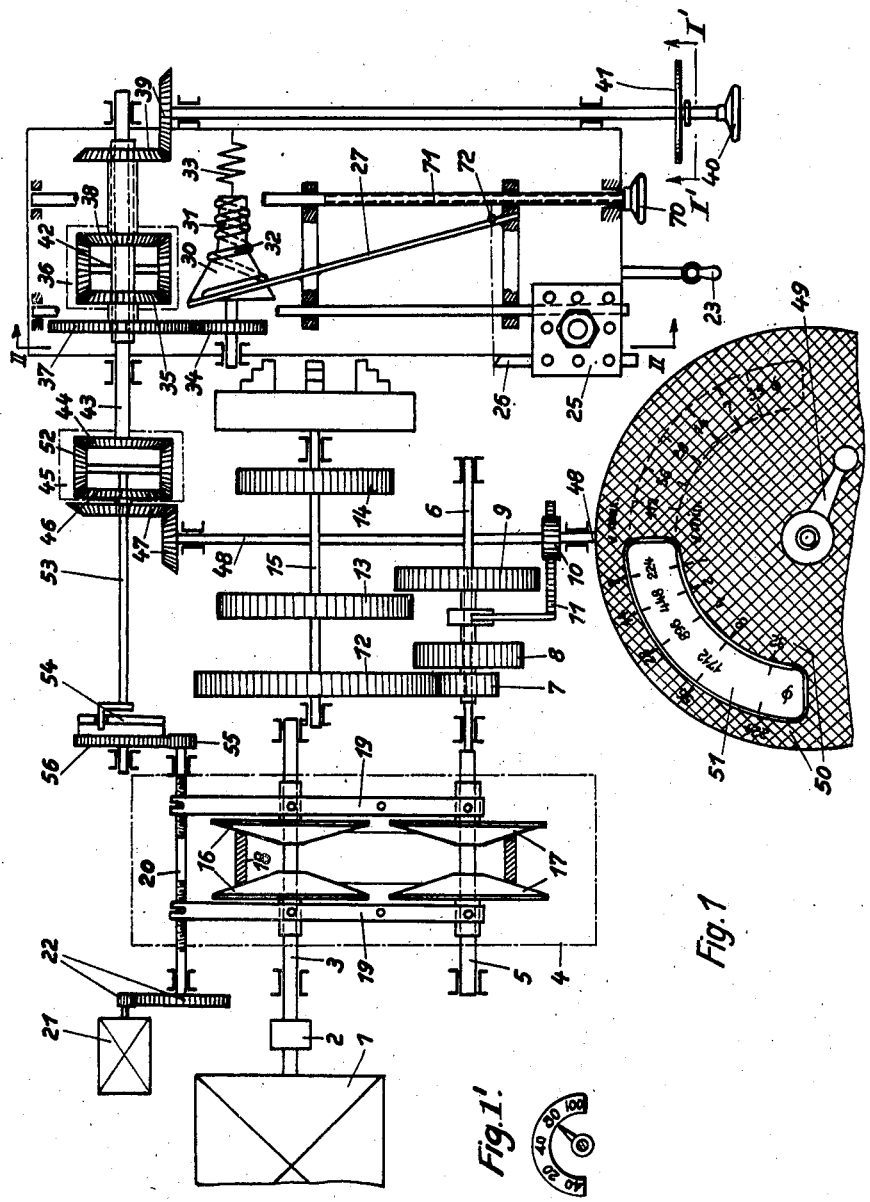

Two forms of the invention are illustrated by way of example in the accompanying drawings, in which Figure 1 is a diagrammatic plan of the first embodiment; Fig. 1' is a sectional view on the line 1'—1' of Fig. 1;

Fig. 2, a section on the line II—II, of Fig. 1;

Fig. 3, a view of the adjusting device;

Figs. 4 to 7 show the essential parts of the second embodiment as applied to a lathe.

More particularly:

Fig. 4 is a side view,

Fig. 5, a plan,

Fig. 6, a view in the direction of the arrow A, of Fig. 4; and

Fig. 7, a section on the line VII—VII, of Fig. 5.

Figures 12, 13:
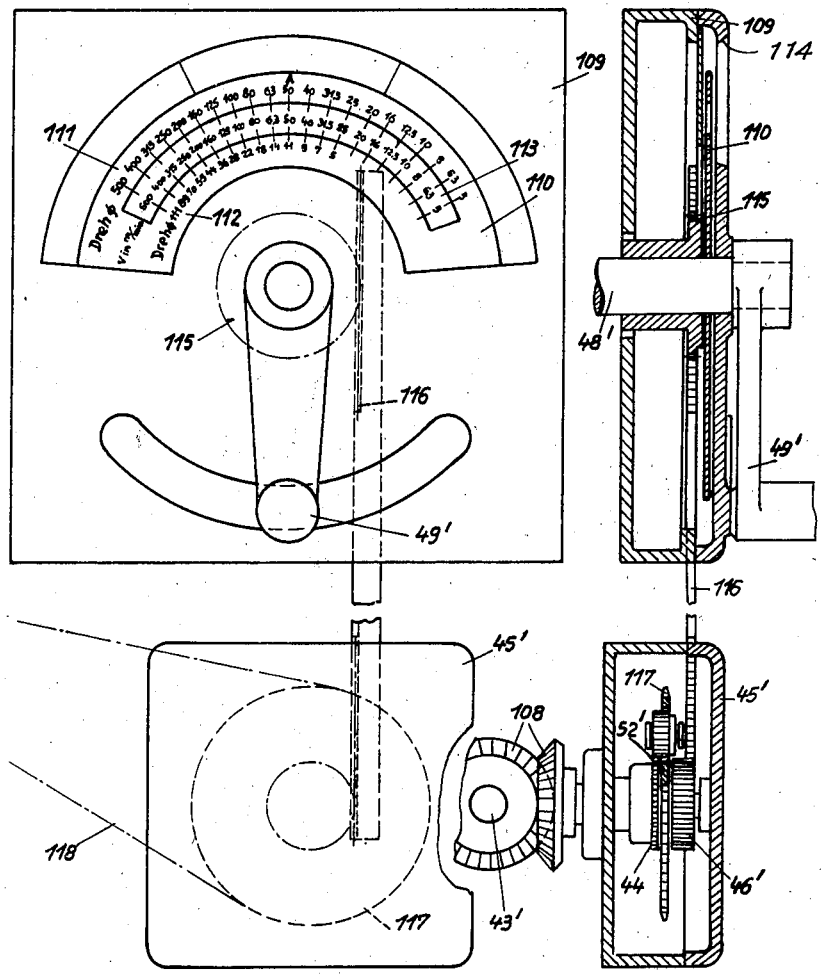

Fig. 8 is a front view of the gear transmitting the motions of the cross slide to a differential gear and a view of the latter;

Fig. 9, a vertical section through this gear;

Fig. 10, a partial view, partly in section, on the line X—X, of Fig. 8;

Fig. 11, a top view of the casing containing this gear;

Fig. 12, a front view of the countershaft adjustment and of the differential gear influenced thereby;

Fig. 13, a vertical section of Fig. 12;

Fig. 14, a vertical section on the line XIV—XIV, Fig. 4, through the adjusting device;

Fig. 15, a cross section on the line XV—XV, of Fig. 14;

Fig. 16, a horizontal section on the line XVI—XVI, of Fig. 15;

Fig. 17, a view in the direction of the arrow B, of Fig. 16, and

Fig. 18, a cross section on the line XVIII—XVIII, of Fig. 14.

In the constructional embodiment of the invention shown in Figs. 1 to 3 a motor 1 drives by a coupling 2 the driving shaft 3 of a gear 4 for infinitely variable speed transmission whose driven shaft 5 is connected with a countershaft 6. On the counter shaft 6 three toothed wheels 7, 8 and 9 can be displaced by a rack 11 actuated by a toothed wheel 10 and thereby brought into engagement with three toothed wheels 12, 13, 14 which are firmly arranged on a working spindle 15.

The variable speed gear 4 comprises two pairs of cone pulleys 16, 17 which are displaceable on the shafts 3 and 5 and between which a V-belt 18 is provided. For regulation, the spacing of the cone pulleys 16, 17 on the two shafts 3, 5 is adjusted by means of the levers 19 which are actuated by a spindle 20 having two threads and driven by an electromotor 21 through gear wheels 22.

On the cross slide 25 carrying the turning tool 26 and displaceable by a hand wheel 23 and a screw spindle 24 a rule 27 is arranged which can be displaced thereon by a hand wheel 70 and a screw spindle 71 so that a mark 72 connected with the rule 27 can be brought into register with the point of the turning tool 26. The rule 27 is disposed obliquely to the direction of motion of the cross slide 25 and its effective lower edge 28 ascends in the same direction. At its rear end the edge 28 has a horizontal portion 29. Transversely to the direction of motion of the cross slide 25 the lathe carries a rotatable cone 30 which at its truncated end is extended to form a roller 31. The cone 30 and the roller 31 possess on their inner surface a helical guide 32 the direction of which corresponds at every point to that of the edges 28 or 29 of the rule 27, the rule 27 and the cone 30 being so arranged relative to one another that the edge 28 or 29 of the rule 27 abuts against the guide 32. During displacement of the cross slide 25 in the direction of decreasing diameters the cone 30 is rotated by the rule 27 pressing against the guide 32. At the return of the cross slide 25 a torsion spring 33 insures steady pressure of the guide 32 relative to the rule 27 and thereby corresponding return motion of the cone 30.

The shaft of the cone 30 carries a gear wheel 34 which drives a gear wheel 37 connected with a sun wheel 35 of a planetary gear 36. The other sun wheel 38 is adjusted through the medium of two bevel gears 39 by a hand wheel 40 which serves for manual adjustment of the cutting speed to be read on a scale 41.

The planet center 42 of the planetary gear 36 is connected with a shaft 43 on which a sun wheel 44 of a second planetary gear 45 is secured. The other sun wheel 46 is driven by bevel gears 47 from the shaft 48 of the toothed wheel 10 of the countershaft adjustment. The toothed wheel 10 is adjusted by a crank 49 with which graduations 50 for maximum and minimum cutting speeds are associated that can be attained at the respective countershaft position by the regulatable lathe drive. These graduations 50 move in front of a stationary scale 51 for the working diameters and clearly indicate within which cutting speed range these diameters may be worked.

The planet center 52 of the gear 45 drives a regulating shaft 53 which actuates an adjusting device 54 for the auxiliary motor 21. The spindle 20 carries a pinion 55 which acts upon a gear wheel 56 for effecting the return of the adjusting device 54.

Fig. 3 shows an adjusting device 54. The regulating shaft 53 firmly supports a contact lever 57 and is further provided with two additional contact levers 58, 59 which are loosely disposed thereon, include between them the lever 57 and are pressed together by a spring 60. Contact between the levers 58, 59 and the lever 57 is prevented by a stop pin 61 which is disposed on the gear wheel 56 acting as return member and is thicker than the contact lever 57. The contact levers 57, 58, 59 are connected with the auxiliary motor 21 equipped for clockwise and counterclockwise running.

The motions of the shaft 53 represent the combined influence of the manual adjustment 40 of the cutting speed, of the cross feed by the planetary gear 36, and of the countershaft adjustment 49 by the planetary gear 45.

When the variable speed gear 4 is in any position within its range and one of the factors influencing regulation is adjusted, the contact lever 57 makes a certain stroke and touches either the contact on the lever 58 or that on the lever 59, according to whether the gear 4 is to run at lower or higher speed. In the event that the contact on the lever 57 touches the contact of the lever 58 the auxiliary motor 21 effecting the regulation of the gear is started in such direction that the gear slows down. The return gear 56 then moves counterclockwise and with the pin 61 attached to it meets the lever 58 and interrupts the contact between the members 57 and 58 whereby the slow speed regulation is completed.

When the position of the turning tool in the radius is reduced or a slower connecting gear thrown in, each of these operations must be compensated by a corresponding speeding up of the gear 4. The lever 57 will then make a return stroke, thereby touching the contact on the lever 59, so that the auxiliary motor 21 of the gear 4 starts to effect speeding up. This motion, too, lasts until the pin 61 of the gear 56 has reached again the lever 59 and thereby interrupts contact between levers 57 and 59.

In case a regulatable drive is employed in which the course of the speeds depending on the position of the regulator is not such that percentually equal variations of the speed are always associated with equally sized angular motions of the stop pin 61, the return device may be constructed in the manner shown in Fig. 3.

The stop pin 61 is in this instance not firmly secured to the gear 56 acting as return disc, but is arranged thereon by means of a crank 62 whose pin 63 supports a lever 64 which is displaced relative to the crank 62 and by a spring 65 is pressed against a stationary cam disc 66 coaxially arranged with the return disc 56 and controlling the position of the pin 61 with respect to the return disc 56 so as to provide the requisite relation between the angular strokes of the stop pin 61 and the variations in speed.

In the second embodiment shown in Figs. 4 to 18 the lathe body is indicated in Figs. 4 to 7 by dot and dash lines.

As in the first embodiment, a motor 1 drives by a coupling 2 the driving shaft 3 of an infinitely variable speed gear 4 whose driven shaft 5 is connected with a countershaft 6 on which two toothed wheels 7, 8 can be displaced by a rack 11 actuated by a toothed wheel 10 and can thus be brought into engagement with two toothed wheels 12, 13 which are firmly secured to the working spindle 15.

The variable speed gear 4 is provided again with two pairs of cone pulleys 16, 17 which are displaceable on the shafts 3, 5 and between which a V-belt 18 is arranged. For regulation, the spacing of the cone pulleys 16, 17 on the two shafts 3, 5 is adjusted by the levers 19 which are actuated by a spindle 20 having two threads and being driven by an electromotor 21 with the aid of gear wheels 22 and a coupling 73.

In this construction also the differential gear 36' with the sun wheels 35', 38' and the planet center 42' is present, but is formed here as spur gearing, and the same applies to the other differential gear 45' with the sun wheels 44', 46' and the planet 52'.

The driving spindle 24' of the cross slide 25' transmits the motions to the sun wheel 35' of the differential gear 36', arranged in a casing 74 secured to the apron of the lathe, in the following manner: The spindle 24' supports a spur gear 75 in mesh with a spur gear 76 disposed on the casing 74. To the shaft 77 of the gear 76 an arm 78 is attached which at its end supports a spur gear 79. In the casing 74 a shaft 80 is firmly arranged one end of which is secured to a shield 81 whilst the other end thereof extends into a hollow space of a shaft 77 and supports bearings 82 about which the shaft 77 rotates. The shaft 80 has firmly secured thereto a spur gear 83 in mesh with the spur gear 79 which rolls over the spur gear 83 during rotation of the shaft 77.

A hub 84 on which a spur gear 85 is firmly arranged is rotatable about the shaft 80, the gear 85 being as large as the gear 83 and is also in mesh with the rotating spur gear 79. The gear 85 has, however, one tooth less than the gear 83 which for instance has sixty teeth against fifty-nine of the gear 85.

To the hub 84 a pressure disc 86 is secured between which and the spur gear 85 a hub 87 of a spur gear 88 is loosely mounted. The hub 87 has an in-built friction clutch 89 and is driven by pins or plugs 91 pressed by springs 90 on to the gear 85 and the pressure disc 86. The spur gear 88 engages a rack 92 displaceably disposed in the casing 74 and guided on a bar 93.

The rack 92 is connected by screws with the lower end of a rule 27' the effective edge 28' of which is inclined and extends at its lower end into a horizontal portion 29'. The upper end of the rule 27' is positioned in a guide 94 secured in the casing 74.

At a single rotation of the gear 79 the gear 85 is moved to the extent of one tooth, so that the rotations of the spindle 24 are transmitted to a considerably reduced degree to the gear 88 and by the latter to the rule 27'.

The rule 27' abuts with its effective edge 28' against a plane curve 95 firmly secured to a shaft 96 in the casing 74, which by means of a spur gear 97 transmits the motions to the sun wheel 35', also formed as spur gear, of the differential gear 36'.

In order to permit adjustment of the rule 27', after the clamping of a tool of different reach, to the position corresponding to the setting of the tool edge a rotary knob 98 is provided on the casing 74, which through the spur gears 99, 100 acts on a spur gear 101 engaging the spur gear 88. During this adjustment the cross slide 25' remains stationary and the gear 88 rotates relative to the gear 85 while the friction of the clutch 89 is overcome. The shaft of the rotary knob 98 supports a drum 102 showing the values of the working diameters, which can be read at a fixed zero mark 103.

For adjusting the desired cutting speed a second rotary knob 40', formed in the first embodiment as hand wheel, acts through spur gears 104, 105 on the other sun wheel 38' of the differential gear 36'. The shaft of the knob 40' supports a drum provided with a cutting speed scale 41', found also in the first embodiment, and with a fixed mark 106 for reading the speed.

The rotations of the sun wheels 35', 38' are summed up in the motion of the planet center 42' which transmits them through a pair of bevel gears 107 to the shaft 43', also found in the first embodiment, whence they are transmitted through a pair of bevel gears 108 to the sun wheel 44' of the differential gear 45'.

The other sun wheel 46' is acted upon by the device for shifting the connecting gear wheels 7, 8. As in the first construction, the toothed wheel 10 is disposed on a shaft 48' which is rotated by a crank 49'. The shaft 48' is arranged in a casing 109 secured to the lathe and supports a disc 110 on which at both edges of an arcuate slot scales 111, 112 for the working diameter are provided. The scales are moved by a fixed scale 113 for the cutting speed and are visible through a window 114 in the front wall of the casing 109. The shaft 48' carries a toothed wheel 115 engaged by a rack 116 which at its other end is in mesh with the sun wheel 46' of the differential gear 45'. The planet center 52' thereof supports a sprocket wheel 117 from which a chain 118 leads as drive to an adjusting device for the speed regulator, which acts as preselector and actuates the auxiliary motor 21.

This adjusting device is positioned in a casing 119. The chain 118 runs over a sprocket wheel 120 mounted on a countershaft 121 in the casing 119 and supporting a spur gear 122 within the casing. The spur gear 122 drives through a spur gear 123 a hollow shaft 126 disposed in bearings 124, 125, the bearing 125 being mounted in an insertion 127 of the casing 119, which embraces the hollow shaft 126. By means of ball bearings 128 the hollow shaft 126 supports a vertical rotatable arm 129 having a hammerlike head 130 in which a pin 132 can be displaced against the action of a spring 131 and carries at its end projecting from the head 130 a roller 133.

In the hollow shaft 126 a shaft 135, displaceable against springs 134, is prevented from rotation within the shaft by a flap 136 secured thereto and disposed in a longitudinal slot 137 of the hollow shaft 126. The rotatable arm 129 embraces the hollow shaft 126 in cliplike fashion and has a pin 138 which is connected with the flap 136 projecting from the slot 137 by a link 139. Rotations of the arm 129 about its axis cause a displacement of the pin 138 in the direction of the axis of the hollow shaft 126 and thereby a displacement of the shaft 135 in the hollow shaft 126.

On its end projecting from the hollow shaft 126 the shaft 135 is provided with a member 141 which is rotatable on the shaft 135 and fixed in axial direction by means of adjusting rings 140. Rotation of the member 141 relative to the casing 119 are prevented, since it is guided with a semi-cylindrical recess on a cylindrical member 142 rotatably disposed relative to an axis parallel with the hollow shaft 126 in the insertion 127. The member 141 retains therefore its position during rotation of the shaft 135 while cooperating in all longitudinal displacements thereof. In the semicylindrical recess of the member 141 a pin 143 is provided which engages a helical groove 144 of the member 142, the latter being rotated by displacement of the pin 143. To the member 142 a reversible switch 146 is attached by means of a bow 145, from whose three contacts three conductors 147 lead to the auxiliary motor 21.

On the insertion 127 of the casing 119, coaxially with the hollow shaft 126, a worm wheel 149 is mounted in a ball bearing 148, which engages a worm 150 vertically disposed thereto on the shaft of which a sprocket wheel 151 is arranged outside the casing 119. From the sprocket 151 a chain 152 leads to a sprocket wheel 153 on the spindle 20.

The worm wheel 149 has a lateral circular running face 154 with a depression 155. The roller 133 abuts against this running face 154 and in the zero position of the adjusting device engages the depression 155.

Each variation of an adjusting factor causes a rotation of the planet member 52' of the differential gear 45', which finds expression in a rotation of the hollow shaft 126 whereby the arm 129 is rotated out of its zero position. In case of smaller motions of the arm 129 the roller 133 remains in engagement with the depression 155, but during larger motions it enters upon the running face 154 and rolls thereon. In either case the head 130 is moved thereby, and this motion is connected with a displacement of the pin 138, which is transmitted to the shaft 135 whose displacement is converted into a rotation of the member 142 whereby the switch 146 is reversed and starts the auxiliary motor 21 which regulates the variable speed gear 4 as required. The worm gear 149, 150 causes the depression 155 to follow the arm 129 until the head 130 is in zero position again, that is, in a plane running through the axis of the hollow shaft 126, whereby also the shaft 135 and the switch 146 are moved into zero position and regulation is completed after the adjusted cutting speed has been attained.

I claim:

1. In a machine tool, particularly a lathe or cutting-off machine, a speed regulator, an adjusting device constituting a preselector for the speed regulator, means for driving the speed regulator, a cutting tool movable over a predetermined path, and means for operatively connecting the cutting tool to the speed regulator including differential gearing controlled by the adjusting device whereby to insure uniformity of cutting speed so that percentually equal variations of the working diameter are associated with equally-sized adjusting paths of the device, which bring about percentually equal speed variations inversely corresponding to the variations in working diameter, all factors influencing the adjusting device for the cutting speed and including adjustment of the cutting speed and variation of working diameters and of connecting gears acting separately, by means of said differential gears, upon the adjusting device constituting the preselector and driving the speed regulator by said regulator driving means.

2. In a machine tool according to claim 1 an adjusting device driven by the cross feed, a speed regulator control by the adjusting device, manual means for adjusting the desired cutting speed and differential gears by means of which the cross feed and the manual adjusting means act upon the adjusting device.

3. In a machine tool according to claim 1 connecting gearings, adjusting means therefor and a differential gear by means of which the adjusting means act upon the adjusting device.

4. In a machine tool according to claim 1 a regulating shaft for controlling the adjusting device for the speed regulator, a planetary gear through the sun wheels of which the manual means for adjusting cutting speed and the cross feed act upon a shaft connected with the planet center of the gear and driving a sun wheel of a second planetary gear the other sun wheel of which is controlled by the countershaft adjustment and the planet center thereof is connected with the regulating shaft.

5. In a machine tool according to claim 1, a rule having an ascending effective edge, a cross slide for displacing said rule and a curviform guide acted upon by the rule during its displacement, the rotations of said guide being transmitted to one member of a differential gear.

6. A machine tool according to claim 1, in which a rule positioned and ascending obliquely to its direction of motion is positively moved by the cross slide directly proportionally thereto and bears against a cone, operatively connected with a member of a differential gear acting on the shaft to which a sun wheel of the second planetary gear is secured, in such manner that during its displacement it presses against a helical guide on the cone and thereby turns the cone and the differential gear member according to the cross feed.

7. A machine tool according to claim 1, in which a rule positioned and ascending obliquely to its direction of motion is positively moved by the cross slide directly proportionally thereto and bears against a cone, operatively connected with a member of a differential gear acting on the shaft to which a sun wheel of the second planetary gear is secured, in such manner that during its displacement it presses against a helical guide on the cone and thereby turns the cone and the differential gear member according to the cross feed, and in which the effective edge of the rule has a rear horizontal portion and the cone is truncated and extends into a roller.

8. A machine tool according to claim 1, comprising a speed regulator, an auxiliary motor therefor, a shaft regulating the speed adjusting device, a contact lever attached to said shaft, two additional contact levers loosely arranged on said shaft and pressed together by a spring, said first contact lever being movably disposed between said two additional levers, a return means, a stop pin connected with the return means moved by the speed regulating means and engaging between said loosely disposed contact levers and interrupting the contact between the contact lever firmly attached to the shaft and a loosely disposed contact lever, said stop pin having such thickness that the contact lever firmly attached to the shaft can stand between said two loosely disposed contact levers without touching them.

9. A machine tool according to claim 1, comprising a speed regulator, an auxiliary motor therefor, a shaft regulating the speed adjusting device, a contact lever attached to said shaft, two additional contact levers loosely arranged on said shaft and pressed together by a spring, said first contact lever being movably disposed between said two additional levers, a return means, a stop pin connected with the return means moved by the speed regulating means and engaging between said loosely disposed contact levers and interrupting the contact between the contact lever firmly attached to the shaft and a loosely disposed contact lever, said stop pin having such thickness that the contact lever firmly attached to the shaft can stand between said two loosely disposed contact levers without touching them, and in which the stop pin is movably disposed on a crank of the return means and is additionally controlled as to its position relative to said return means by a stationary cam disc.

10. A machine tool according to claim 1, in which the rule is displaced in its plane and acts upon a curve positioned in this plane and movable about a shaft arranged vertically thereto, the rotations of said curve serving for adjusting the differential gear member.

11. A machine tool according to claim 1, in which the rule is displaced in its plane and acts upon a curve positioned in this plane and movable about a shaft arranged vertically thereto, the rotations of said curve serving for adjusting the differential gear member and in which the rotations of the driving spindle of the cross slide are transmitted by a reducing gear to a rack vertically disposed relative to the spindle and displacing the rule.

12. A machine tool according to claim 1, in which the rule is displaced in its plane and acts upon a curve positioned in this plane and movable about a shaft arranged vertically thereto, the rotations of said curve serving for adjusting the differential gear member and in which in the drive of the rule a friction clutch is provided and also means for adjusting the rule to a working diameter read on a scale, said means acting on a gear member between the friction clutch and the rule and permitting adjustment of the rule to a working diameter corresponding to the position of the clamped tool while overcoming the friction of the clutch.

13. A machine tool according to claim 1, in which an auxiliary electric motor for the speed regulator is provided and the adjusting device comprises a hollow shaft adjustable by the elements determining cutting speed, said hollow shaft having an arm whose rotatable head is operatively connected with a pin, non-rotatably yet longitudinally displaceably disposed in the hollow shaft, in such manner that rotations of the head about its axis cause displacements of the pin through which a switch for starting and stopping the auxiliary motor is moved and that the head, positioned in a plane passing through the axis of the hollow shaft when in zero position, carries a roller bearing against a circular guide rotatable about the hollow shaft and driven by the speed regulator, said guide having a depression engaged by the roller when the guide and head are in zero position so that relative rotation of the circular guide and arm causes rotation of the head, emergence of the roller from the depression and a corresponding displacement of the pin and motion of the switch.

14. A machine tool according to claim 1, in which an auxiliary electric motor for the speed regulator is provided and the adjusting device comprises a hollow shaft adjustable by the elements determining cutting speed, said hollow shaft having an arm whose rotatable head is operatively connected with a pin, non-rotatably yet longitudinally displaceably disposed in the hollow shaft, in such manner that rotations of the head about its axis cause displacements of the pin through which a switch for starting and stopping the auxiliary motor is moved and that the head, positioned in a plane passing through the axis of the hollow shaft when in zero position, carries a roller bearing against a circular guide rotatable about the hollow shaft and driven by the speed regulator, said guide having a depression engaged by the roller when the guide and head are in zero position so that relative rotation of the circular guide and arm causes rotation of the head, emergence of the roller from the depression and a corresponding displacement of the pin and motion of the switch and in which the head and its supporting arm are rotatable about the axis thereof disposed vertically to the axis of the hollow shaft and the circular guide forms a wheel provided in its side facing the head with a running face having a depression.

15. A machine tool according to claim 1, in which an auxiliary electric motor for the speed regulator is provided and the adjusting device comprises a hollow shaft adjustable by the elements determining cutting speed, said hollow shaft having an arm whose rotatable head is operatively connected with a pin, non-rotatably yet longitudinally displaceably disposed in the hollow shaft, in such manner that rotations of the head about its axis cause displacements of the pin through which a switch for starting and stopping the auxiliary motor is moved and that the head, positioned in a plane passing through the axis of the hollow shaft when in zero position, carries a roller bearing against a circular guide rotatable about the hollow shaft and driven by the speed regulator, said guide having a depression engaged by the roller when the guide and head are in zero position so that relative rotation of the circular guide and arm causes rotation of the head, emergence of the roller from the depression and a corresponding displacement of the pin and motion of the switch and in which the displacements of the pin are converted by a member non-displaceably yet rotatably arranged thereon whose rotation relative to the casing is prevented by a guide and which engages with a pin a helical groove of a rotatable member disposed parallel to said first pin into rotations of the latter member which supports a reversible switch.

ALBRECHT MAURER.